United States Patent Office 3,585,179
Patented June 15, 1971

3,585,179
PROCESS FOR EXTRACTING PROTEINS FROM MICROORGANISMS
Hirotoshi Samejima, Hiroshi Teranishi, and Takashi Deguchi, Machida-shi, Japan, assignors to Kyowa Hakko Kogyo Co., Ltd., Tokyo, Japan
No Drawing. Filed Aug. 3, 1967, Ser. No. 658,049
Claims priority, application Japan, Aug. 5, 1966, 41/51,089, 41/53,277; Feb. 21, 1967, 42/10,667
Int. Cl. A23j *1/18;* C07g *7/028*
U.S. Cl. 260—112
18 Claims

ABSTRACT OF THE DISCLOSURE

A process for extracting proteins from microorganisms which comprises pre-treating said microorganisms by heating the microorganisms in an aqueous acidic solution and then extracting the proteins with a suitable extracting agent. Acids preferably used for the pre-treatment are mineral acids, acetic acid, oxalic acid, citric acid and formic acid. Suitable extracting agents include water, aqueous solutions of inorganic salts, aqueous alkali solutions, for example, sodium hydroxide and aqueous urea solutions. Preferred conditions include heating at from room temperature (25° C.) to about 100° C., acid concentrations of about 0.5 to 2 N and extraction with aqueous solutions having a pH of about 7.

---

This invention relates to a process for extracting proteins from the bacterial cells of microorganisms. More particularly, it relates to a process for extracting proteins from microorganisms by a two-step process involving a pretreatment and an extraction step.

Recently, the importance of extracted vegetable proteins as food-stuffs and industrial materials has been recognized throughout the world. The mass production of such substances has been steadily developed. Moreover, despite the fact that it has been known for a long time that bacterial cells of microorganisms possess the capability of being protein sources of high nutritive value, there have been many problems from the standpoint of characteristics such as digestibility taste and foodstuff processing. Therefore, it is considered that if proteins can be extracted and recovered efficiently from the bacterial cells of microorganisms, these problems can be essentially solved.

Bacterial cells can be freely mass-produced industrially irrespective of the four seasons from carbon sources such as sugars and hydrocarbons, simple nitrogen sources such as ammonia and ureas and from inorganic salts. Hope has been held that such cells would provide future sources of protein. Generally, microorganisms possess mechanically and chemically strong cell walls and when used for foodstuffs as they are, the digestion ratio thereof is unfavorable. Moreover, the taste is not always satisfactory depending upon the particular type of microorganism. At this point, development of a process for extracting proteins from microorganisms has a great significance.

Up to now, processes have been developed for extracting proteins from microorganisms which involve recovering proteins extra-cellularly which have been liberated after mechanical grinding and supersonic treatment of bacterial cells of microorganisms. However, such processes require a great amount of energy for breaking of the bacterial cells. Also, there is no apparatus available of such a large scale that such processes can be achieved practically. Processes have also been reported in the prior art whereby proteins are extracted after treating the bacterial cells with solvents and surface active agent-containing solutions. But, these processes are less effective for certain kinds of microorganisms, especially with gram-positive bacteria.

There is also known another process whereby the contents of the cells are extracted after auto-digestion thereof. A majority of the proteins, however, is degraded to low molecular weight substances by enzymatic action possessed by the bacterial cells themselves. Accordingly, the yield of high molecular weight proteins is deteriorated.

Another process for extracting proteins from bacterial cells with aqueous alkali solutions is known, but a sufficient effect generally requires alkalies of high concentrations. Depending upon the particular type of microorganism, a very low extraction ratio is obtained even with alkalies of high concentration. This is particularly true with, for example, gram-positive bacteria. Furthermore, disadvantages and drawbacks such as decomposition and degradation of the proteins, once they are extracted, are observed.

Recently, a process for extracting proteins from Torula yeast by using urea solutions has been reported [Mitsuda, Kawai, Mibu and Kanai, Jour. Japanese Soc. of Food and Nutrition, vol. 17, No. 5, pages 342–346 (1965)]. Proteins of good quality were extracted in a fairly high yield with the process. Yet, even this prior art process has its disadvantages.

One of the objects of the present invention is to provide an improved process for extracting proteins from microorganisms which overcomes the disadvantages and deficiencies of the prior art methods.

Another object of the present invention is to provide a process for extracting proteins from the bacterial cells of microorganisms which may be carried out in an efficacious and simple manner.

A further object of the invention is to provide a process for obtaining proteins from microorganisms which may be carried out advantageously on an industrial scale to give a high yield of product.

A still further object of the invention is to provide proteins from microorganisms.

These and other objects and advantages of the present invention will become apparent to those skilled in the art from a consideration of the following specification and claims.

In accordance with the present invention, it has been found that the majority of proteins contained in bacterial cells can be easily extracted in favorable yields by preliminarily heating the cells of microorganisms with dilute acids under comparatively moderate conditions and then extracting the same with water, salt solutions such as sodium chloride, alkali solutions such as sodium hydroxide, calcium hydroxide, potassium hydroxide and ammonium hydroxide, and/or urea solutions. The extraction may be effected at any suitable pH in the vicinity of neutral (but, in the case of urea solutions, at neutral or slightly alkaline pH's). The process of the present invention may be practiced easily, cheaply and efficiently from the industrial standpoint on microorganisms generally known. For example, a urea extraction achieved under neutral or weakly alkaline conditions, after subjecting the microorganism cells preliminarily to proper heat-treatment in dilute acids, makes it possible to extract proteins of good quality in more favorable yields than that obtained by the individual use of the urea extraction method per se.

It is not intended to limit the present invention by the veracity of any theoretical explanation thereof, however, it is believed that the cell walls of microorganisms are formed of polysaccharides, polypeptides and the like and that the acid treatment of the present invention ruptures a portion of the bonds in the polysacchardies, thereby destroying a part of the cell walls and facilitating the extraction of proteins from the cells. Protein extraction from the cell walls of gram-positive bacteria with alkaline solutions is generally difficult because of the high content of polysaccharides, but according to the present process, the proteins can be easily extracted, which helps to buttress the above interpretation.

The process of the present invention may be carried out, for example, as follows. Protein extraction is achieved comparatively easily and efficiently by suspending living or dry bacterial cells of microorganisms in dilute acids, for example, having normalities ranging from 0.5 to 2, and then treating the suspension of cells with heat for a short time at any temperature above room temperature, favorably at 60–100° C. The suspension, or the bacterial cells recovered therefrom, is then dipped in water or the abovementioned extracting agents at any pH in the vicinity of neutral (except in the case of urea solutions, wherein a pH or around neutral or slightly alkaline is employed, i.e., from about 6 to 9). The latter treatment may be accomplished at room temperature or with heating.

Up to the present, it has been considered that the acid treatment of proteins causes the denaturation and decomposition thereof, and such a treatment has never been used as a pre-treatment for the extraction of proteins from the cells of microorganisms. Accordingly, the present invention represents a genuine advance in the art.

The following experimental examples will help to illustrate the present invention. Unless otherwise indicated, the percentages therein are by weight.

EXPERIMENTAL EXAMPLE 1

Table 1 shows the extraction ratios of total nitrogen and protein nitrogen obtained by extracting proteins from *Brevibacterium ammoniagenes* ATCC 6872, a gram-positive bacterial strain, with water and aqueous caustic soda (sodium hydroxide) solutions of various concentrations, alternatively by extraction with aqueous caustic soda solutions after the preliminary heating of the microorganisms in dilute hydrochloric acid. In this experiment 10 grams of living microorganisms of *Brevibacterium ammoniagenes* [water content 62.2%, total nitrogen content 9.6% (to dry weight) and protein nitrogen 8.3% (to dry weight)] were used in each case.

TABLE I

| Condition for pre-treatment | | | Condition for extraction | | | | Extraction ratio of nitrogen fraction, percent | |
|---|---|---|---|---|---|---|---|---|
| Concentration of hydrochloric acid | Amount of hydrochloric acid added, ml. | Treating temperature, °C. | Treating time, hours | Extracting agent | Amount of extracting agent added, ml. | Treating temperature, °C. | Treating time, hours | Extraction ratio of total nitrogen [1] | Extraction ratio of protein nitrogen [2] |
| | | | | Water | 20 | 24 | 3 | 11.5 | 3.2 |
| | | | | 0.5% NaOH | 20 | 24 | 3 | 8.3 | 2.7 |
| | | | | 1% NaOH | 20 | 24 | 3 | 9.0 | 3.5 |
| | | | | 2% NaOH | 20 | 24 | 3 | 13.7 | 4.0 |
| | | | | 4% NaOH | 20 | 24 | 3 | 16.2 | 4.5 |
| | | | | 8% NaOH | 20 | 24 | 3 | 18.2 | 5.0 |
| | | | | 2% NaOH | 40 | 24 | 3 | 18.8 | 8.0 |
| | | | | 4% NaOH | 40 | 24 | 3 | 20.6 | 8.5 |
| | | | | 2% NaOH | 40 | 40 | 3 | 27.3 | 13.3 |
| | | | | do | 40 | 60 | 3 | 28.0 | 14.5 |
| 1 N | 20 | 98 | 1 | do | [3] 40 | 24 | 3 | 41.7 | 32.6 |
| 2 N | 20 | 98 | 1 | do | [3] 40 | 24 | 3 | 74.5 | 42.7 |

[1] Calculated by presuming that total nitrogen in used bacterial cells was 100%.
[2] Calculated by presuming that protein nitrogen in used bacterial cells was 100%.
[3] NaOH was added so that the NaOH was 2% of the total when the volume of solution was brought to 40 ml., since 20 ml. of acid had been preliminarily added.

As shown in Table 1, the extraction of a living microorganism such as *Brevibacterium ammoniagenes* with water or aqueous caustic soda solutions of various concentrations gives extremely low extraction ratios of proteins. On the other hand, those preliminarily treated with 1–2 N hydrochloric acid at 98° C. for one hour show extremely high extraction ratios both of total nitrogen and of protein nitrogen (nitrogen insoluble to heated 7%; trichloroacetic acid) after subsequent extraction with caustic soda. Moreover, the cells subjected to a preliminary acid treatment show far higher protein extraction ratios than that observed when a higher temperature condition (for example, 40° and 60° C.) is used for untreated materials in an extraction step with alkali.

EXPERIMENTAL EXAMPLE 2

Table 2 shows the results of a similar test carried out with dried materials of *Corynebacterium glutamicum* (*Micrococcus glutamicus*) ATCC 13761, a gram-positive bacterium, drying having been effected with a spray dryer (water 8.8%, total nitrogen 12.2%, protein nitrogen 9.1%). In Table 2, 1 gram of the said dried bacterial cells of *Corynebacterium glutamicum* (*Micrococcus glutamicus*) was used in each case.

TABLE 2

| Condition for pre-treatment | | | | Condition for extraction | | | | Extraction ratio of nitrogen fraction, percent | |
|---|---|---|---|---|---|---|---|---|---|
| Concentration of hydrochloric acid | Amount of hydrochloric acid added, ml. | Treating temperature, °C. | Treating time, hours | Extracting agent | Amount of extracting agent added, ml. | Treating temperature, °C. | Treating time, hours | Extraction ratio of total nitrogen [1] | Extraction ratio of protein nitrogen [2] |
| | | | | Water | 10 | 24 | 3 | 14.2 | 1.1 |
| | | | | pH 7, 0.1 M phosphate buffer. | 10 | 24 | 3 | 14.4 | 2.1 |
| | | | | 0.05 M saline water. | 10 | 24 | 3 | 14.5 | 3.3 |
| | | | | 0.5% NaOH | 10 | 24 | 3 | 16.4 | 6.1 |
| | | | | 1% NaOH | 10 | 24 | 3 | 21.5 | 12.4 |
| | | | | 2% NaOH | 10 | 24 | 3 | 24.9 | 16.4 |
| | | | | 4% NaOH | 10 | 24 | 3 | 31.8 | 23.7 |
| | | | | 8% NaOH | 10 | 24 | 3 | 38.7 | 25.3 |
| | | | | 0.5% NaOH | 10 | 34 | 26 | 13.9 | 6.2 |
| | | | | 1% NaOH | 10 | 24 | 26 | 19.5 | 16.8 |
| 0.5 N | 5 | 98 | 1 | 2% NaOH | [3] 10 | 24 | 3 | 39.8 | 47.3 |
| 1 N | 5 | 98 | 1 | do | [3] 10 | 24 | 3 | 83.8 | 72.1 |
| 2 N | 5 | 98 | 1 | do | [3] 10 | 24 | 3 | 82.9 | 68.8 |
| 1 N | 5 | 98 | 1 | Water | [3] 10 | 24 | 3 | 54.7 | 50.2 |

[1] Calculated by presuming that total nitrogen in used bacteria cells was 100%
[2] Calculated by presuming that protein nitrogen in used bacterial cells was 100%
[3] NaOH was added so that the concentration of NaOH attained the concentrations shown when the volume of solution was brought to 10 ml. since 5 ml. of acid had been preliminarily added in the pre-treatment.
[4] When the solution obtained after the pre-treatment was brought to a volume of 10 ml. it was neutralized, with NaOH so that its pH was adjusted to 7.0.

As also observed in Table 2, when an acid and a heat heat treatment are used, the protein extraction ratio is remarkably enhanced by the addition of either water or an alkali as an extracting agent subsequently used, as compared with that of untreated materials.

EXPERIMENTAL EXAMPLE 3

The microorganism used in the present experiment was spray-dried cells of *Corynebacterium glutamicum* (*Micrococcus glutanicus*) ATCC 13761, which has a water content of 8.8%, a total nitrogen content of 12.2% and a protein nitrogen content of 9.1%. One gram of this microorganism was used in each case, and the extraction ratio of total nitrogen and protein nitrogen was calculated from the result of determinations of the total nitrogen and the nitrogen insoluble in 7% trichloroacetic acid (proteinous nitrogen) achieved after acid treatment, extraction and dialysis (the latter being only in the case of extraction with urea). The results are shown in Table 3.

to the type of apparatus employed, when used industrially. And, treatment with lysozyme, trisodium ethylenediaminetetraacetic acid (EDTAA-trisodium salt), ethanol and organic acid salt solutions are only slightly effective in improving the extraction ratio. In contrast thereto, cells subjected to heat treatment in organic acid aqueous solutions, such as formic acid, acetic acid, oxalic acid, citric acid and the like, show extremely elevated extraction ratios of protein both when extraction is carried out with urea solutions and when it is carried out with caustic soda. This is because the cell walls of microorganisms are effectively broken by heat-treatment with organic acids, thereby facilitating the subsequent extraction with urea or caustic soda.

When extraction is carried out with a urea solution after pre-treatment, solutions of urea of 4–10 M are used after neutralization. In this range, the higher the urea concentration, the better the extraction ratio. As to the extracting temperaure, higher temperatures give better

TABLE 3

| Condition for acid treatment | | | | Condition for extraction | | | | | Extraction ratio of nitrogen fraction, percent | |
| --- | --- | --- | --- | --- | --- | --- | --- | --- | --- | --- |
| Concentration of hydrochloric acid | Amount of hydrochloric acid added, ml. | Treating temperature, °C. | Treating time, min. | Extracting agent | Amount of of extracting agent added, ml. | Treating temperature, °C. | Treating time, hours | Dialyzing period, hours | Extraction ratio of total nitrogen [1] | Extraction ratio of protein nitrogen [1] |
| | | | | Water [3] | 15 | 24 | 24 | | 9.0 | 1.2 |
| | | | | 1% NaOH | 15 | 24 | 24 | | 20.1 | 17.2 |
| | | | | 2% NaOH | 15 | 24 | 24 | | 24.6 | 19.8 |
| | | | | 10 M urea Plus water | 10 5 | 24 | 24 | 72 | 9.2 | 7.2 |
| | | | | 10 M urea Plus water | 10 5 | 40 | 24 | 72 | 15.0 | 13.8 |
| | | | | 10 M urea Plus water | 10 5 | 60 | 24 | 72 | 28.0 | 23.9 |
| 1 N | 5 | 98 | 30 | Water [3] | 10 | 24 | 24 | 72 | 36.6 | 32.9 |
| | 5 | 98 | 30 | do [3] | 10 | 40 | 24 | | 41.3 | 39.0 |
| | 5 | 98 | 30 | do [3] | 10 | 60 | 24 | | 46.2 | 43.5 |
| 1 N | 5 | 98 | 30 | 10 M urea | 10 | 24 | 24 | 72 | 56.7 | 43.3 |
| | 5 | 98 | 30 | do | 10 | 40 | 24 | 72 | 62.5 | 49.9 |
| | 5 | 98 | 30 | do | 10 | 60 | 24 | 72 | 75.5 | 60.2 |

[1] Calculated by presuming that the total nitrogen content in the used microorganisms is 100%.
[2] Protein nitrogen (7% trichloroacetic acid-insoluble nitrogen) content in used microorganisms was presumed to be 100%.
[3] When water was used as an extracting agent, the pH was adjusted to 7.0 with 10 N caustic soda (sodium hydroxide).

As is apparent from Table 3, the microorganism cells extracted with urea after a preliminary acid treatment show far higher protein extraction ratios than those extracted with urea or water or alkali without acid treatment.

EXPERIMENTAL EXAMPLE 4

Table 4 shows the protein extraction ratios observed by extracting lyophilized cells of *Corynebacterium glutamicum* ATCC 13761, a type of gram-positive bacteria (protein content, 53.3% to dry weight), with an 8 M urea solution or a 2% caustic soda solution achieved after pre-treatment by various processes. In this case, after various pre-treatments had been carried out, if a pre-treated material was acidic, it was neutralized with caustic soda. When it was neutral, the supernatant liquid was separated by centrifugation as it was and the treated cells thus separated were extracted at 40° C. for 24 hours by the addition of an 8-M urea aqueous solution of as much as 10 times (ml./g.) the weight of original microorganisms (dry weight). The extraction ratios were obtained from the total amounts of protein in the pre-treated solutions and extracts. On the other hand, when treated microorganisms were extracted with 2% aqueous solutions of caustic soda, the extraction ratios were obtained from the total amounts of protein in the pre-treated solutions and extracts obtained after three hours of extraction at room temperature by the addition of a 2% aqueous solution of caustic soda in an amount of 10 times the weight of original microorganisms (dry weight).

As shown in Table 4, the breaking of bacterial cells by grinding with quartz sand or by supersonic treatment gives fairly good extraction ratios of proteins. However, these methods still involve problems, such as that with respect extraction ratios in a range above room temperature and below 60° C.

TABLE 4

| | Protein extraction ratio by (percent)— | |
| --- | --- | --- |
| Condition for pre-treatment | 8 M urea solution | 2% caustic soda |
| Untreated (control) | 6.5 | 16.4 |
| Ground with quartz sand | 22.3 | |
| Frozen and melted | 7.7 | 17.0 |
| Supersonic treatment [1] | 41.7 | |
| Lysozyme treatment [2] | 9.2 | |
| 1 N formic acid (added 20 fold amount, 100° C., 10 minutes) | 22.2 | 32.6 |
| 1 N acetic acid (added 20 fold amount, 100° C., 10 minutes) | 20.0 | 30.3 |
| 1 N propionic acid (added 20 fold amount, 100° C., 10 minutes) | 18.8 | 28.0 |
| 1 N n-butyric acid (added 20 fold amount, 100° C., 20 minutes) | 18.0 | 25.1 |
| 1 N n-valeric acid (added 20 fold amount, 100° C., 20 minutes) | 18.1 | 25.2 |
| 1 N-caproic acid (added 20 fold amount, 100° C., 20 minutes) | 18.5 | 28.2 |
| 1 N humaric acid | 20 | 31 |
| 1 N malic acid | 23 | 33 |
| 1 N oxalic acid (added 20 fold amount, 100° C., 20 minutes) | 45.0 | 65.4 |
| 1 N oxalic acid (added 20 fold amount, 100° C., 10 minutes) | 40.1 | 55.1 |
| 1 N citric acid (added 20 fold amount, 100° C., 10 minutes) | 20.6 | 31.0 |
| 2.5% sodium oxalate (added 20 fold amount, 100° C., 10 minutes) | 4.7 | 15.0 |
| 2.5% ammonium oxalate (added 20 fold amount, 100° C., 10 minutes) | 6.0 | 15.9 |
| 30% ethanol (added 10 fold amount, 4° C., 60 minutes) | 6.7 | 16.4 |
| 50% ethanol (added 10 fold amount, 4° C., 60 minutes) | 7.7 | 17.4 |
| 70% ethanol (added 10 fold amount, 4° C., 60 minutes) | 9.2 | 19.2 |
| 10mM. EDTA trisodium salt (added 20 fold amount, 100° C., 10 minutes) | 3.5 | |

[1] Treated by 20 kc. supersonic waves at 4° C. for 30 minutes in 25 fold amount of 0.01 M phosphate buffer of pH 7.5.
[2] Treated by addition of 3 mg. percent (0.003%(w./v.)) of lysozyme at 30° C. for 3 hours in 25 fold amount of 0.01 M phosphate buffer of pH 6.3.

In the process of the present invention, acids which may be used for the acid treatment are mineral acids such as hydrochloric acid, sulfuric acid and phosphoric acid as well as organic acids such as acetic acid, oxalic acid, citric acid, formic acid, n-caproic acid, fumaric acid, maleic acid, etc. If the edibility of the extracted protein is taken into consideration, hydrochloric acid is the preferred mineral acid to be employed. Moreover, oxalic acid and citric acid are favored among the organic acids since these acids can be reused because of their easy sedimentation and recovery as calcium salts from waste solutions obtained after protein extraction and recovery.

As to the acid concentration to be used for the acidic treatment, higher concentrations are preferred in order to break down the cell walls of the microorganisms. However, a range of 0.5–2 N is preferred to avoid denaturation and decomposition of intra-cellular protein.

The temperature for the acid treatment may be varied, but temperatures below 100° C. are preferred in order to prevent excessive decomposition.

An example of these experimental conditions may be observed by using 1 gram of dried cells of *Corynebacterium glutamicum* (*Micrococcus glutamicus*) ATCC 13761, as shown in Table 2. In such a case, an acid concentration of 2 N is already somewhat excessive and a tendency for the partial degradation of the protein is observed.

EXPERIMENTAL EXAMPLE 5

The effects of temperature and the amount of acid treatment time were investigated by using 1 gram of dried cells of *Corynebacterium glutamicum* (*Micrococcus glutamicus*) ATCC 13761. The results thereof are shown in Table 5.

As shown in Table 5, adequate heating is required as a condition for pre-treatment. As far as the amount of treating-time is concerned, it will be observed that shorter times, such as 15–30 minutes, are preferred. Longer durations of time tend to indicate a degradation of the extracted protein.

As mentioned above, it is necessary to adequately select the acid concentration, the treatment temperature and the treatment time according to the particular type of microorganism employed. At any rate, it is clear that preliminary heat treatment of bacterial cells with acids markedly enhances the protein extraction ratio as compared with the ratio obtained without any such pre-treatment.

Protein solutions extracted in accordance with the present invention can be subjected to solid-liquid separation to recover only the protein after precipitating the protein at the isoelectric point by adjustment of the pH to 3–5 with or without dialysis or after a salting out precipitation by addition of neutral salts or after precipitation by the addition of organic solvents. The extracts can be used for foodstuffs as they are or after processing.

Protein obtained in accordance with this invention can be uniformly dispersed easily at neutral and alkaline pH's and can be easily digested by digestive enzymes such as trypsin. Compared to animal proteins, the content of indispensable amino acids in the extracted proteins is very large.

The following examples are given merely as illustrative of the present invention and are not to be considered as limiting. Unless otherwise noted, the percentages in the examples and throughout the application are by weight.

Example 1

Five hundred grams of dried cells of *Corynebacterium glutamicum* (*Micrococcus glutamicus*) ATCC 13761 (total nitrogen content, 14.64%; protein nitrogen content, 9.1%) are suspended in 25 liters of 1 N hydrochloric acid and heated for one hour in a boiling water bath with stirring, to which 25 liters of 2 N caustic soda aqueous

TABLE 5

| Item of investigation | Condition for pre-treatment | | | Condition for extraction | | | | Extraction ratio of nitrogen fraction, percent | | |
|---|---|---|---|---|---|---|---|---|---|---|
| | Concentration of hydrochloric acid, normal | Amount of hydrochloric acid added, ml. | Treating temperature °C. | Treating time | Extracting agent | Amount of extracting agent added, ml.[1] | Treating temperature, °C. | Treating time, hours | Extraction ratio of total nitrogen[2] | Extraction ratio of protein nitrogen[3] |
| Effect of temperature at the time of pretreatment | 1 | 5 | 24 | 1 hour | 2% NaOH | 10 | 24 | 3 | 25.7 | 14.9 |
| | 1 | 5 | 60 | do | do | 10 | 24 | 3 | 52.2 | 38.4 |
| | 1 | 5 | 98 | do | do | 10 | 24 | 3 | 83.8 | 72.1 |
| Pretreating time effect | 1 | 5 | 98 | 15 minutes | 2% NaOH | 10 | 24 | 3 | 71.7 | 81.1 |
| | 1 | 5 | 98 | 30 minutes | do | 10 | 24 | 3 | 86.0 | 81.4 |
| | 1 | 5 | 98 | 60 minutes | do | 10 | 24 | 3 | 83.8 | 72.1 |

[1] NaOH was added so that the concentration of NaOH attained the concentrations shown when the volume of solution was brought to 10 ml, since 5 ml. of acid had been preliminarily added in the pre-treatment.
[2] Calculated by presuming that total nitrogen in used bacterial cells was 100%.
[3] Calculated by presuming that protein nitrogen in used bacterial cells was 100%.

solution is added after cooling. Protein is extracted by continuation of stirring for 3 hours at room temperature. The extract and residue are subsequently separated by centrifugation, and the extract (5.65 liters) is adjusted to a pH of 4.0 by the addition of 6 N hydrochloric acid and is allowed to stand overnight in a cold room regulated at 5° C. to complete the precipitation and sedimentation of protein. The protein fraction precipitated is collected by centrifugation, and an adequate amount of water is added thereto to make a porridge-like fluid which is dried into a powder by a spray dryer. The yield is 368 grams, which represents 73.6% of the weight of original microorganisms.

The powdered protein thus obtained consists of 6.4% water, 70.3% of crude protein content (total nitrogen percent times 6.25) and 2.3% of reducing sugar (as glucose). It uniformly disperses in water at a pH of 7.0. An artificial digestion ratio test by trypsin shows a digestion ratio of 78.7%, which indicates that the protein is of a very good quality as compared with a commercial protein extracted from soy beans, the latter showing a digestion ratio of 50.6% as determined by the same method.

Example 2

One hundred grams of dried cells of *Corynebacterium glutamicum* (*Micrococcus glutamicus*) ATCC 13761 total nitrogen content, 12.2%; protein nitrogen content, 9.1%) are suspended in 500 ml. of 1 N hydrochloric acid, heated in a boiling water bath with stirring, kept for 30 minutes after the internal temperature rises up to 95° C., whereby the pH of the suspension is adjusted to 7.0 by the gradual addition of 10 N sodium hydroxide, and extracted by the addition of 1 liter of a 10 M urea solution at 60° C. for 24 hours with stirring. The extract is centrifuged to remove solid constituents. The solid portion is further washed with 200 ml. of water, which is then centrifuged and combined with the above supernatant. The combined solution is dialyzed in 6 dialyzing membrane bags, about 300 ml. in each, against running tap water. After 72 hours of dialysis, the contents of the bags are combined, adjusted to a pH of 4.2 with hydrochloric acid and allowed to stand overnight in a cold room at 5° C. The resulting precipitate is separated from the solution by centrifugation. As a result, 40.2 grams of lyophilized powder is obtained.

The water content and protein content (total nitrogen percent times 6.25) of the resultant powder are 6.5% and 85.2%, respectively. This protein is uniformly dispersed in water when adjusted to a pH of 7. An artificial digestion ratio observed with trypsin is 90.6%, showing that the product is a protein of very high quality as compared with a commercial protein extracted from soy beans, the latter showing a digestion ratio of 50.6% as determined by the same method.

Example 3

As described in Example 2, 100 grams of dried cells of *Corynebacterium glutamicum* (*Micrococcus glutamicus*) ATCC 13761 are similarly subjected to acid treatment, adjusted to a pH of 3.5 with 10 N sodium hydroxide and centrifuged to remove the supernatant liquid. Then, 1.5 liters of 10 M urea solution is added to the residue, which is extracted for 24 hours with stirring after a pH adjustment to 7.0 with 10 N sodium hydroxide. After extraction, removal of the residue and dialysis are carried out as described in Example 2, the dialyzed solution separated in bags is combined, adjusted to a pH of 4.0 with hydrochloric acid, allowed to stand overnight in a room maintained at 5° C. and then separated into solid and fluid constituents in order to collect the precipitated protein. As a result, 48.2 grams of lyophilized powder is obtained. This protein powder contains 6.8% of water and 84.9% of protein (total nitrogen percent times 6.25).

Example 4

45.2 grams of protein powder is obtained by suspending 300 grams of living cells of *Brevibacterium ammoniagenes* ATCC 6872 [(water content, 64.8%; total nitrogen content, 9.4% (to dry weight) and protein nitrogen content, 8.2% (to dry weight)] in 300 ml. of 2 N hydrochloric acid, heating in a boiling water bath with stirring, while keeping the contents at 95° C. for 30 minutes after a rise of temperature thereof, adjusting the pH of the contents to 4.0 by the addition of 10 N sodium hydroxide, removing the supernatant liquid by centrifugation and effecting extraction, dialysis, protein separation and drying steps after the addition of 1.5 liters of 10 M urea solution and a pH adjustment to 7.0 with 10 N sodium hydroxide. The resultant protein powder is analyzed and found to contain 6.4% of water and 85.6% of protein (total nitrogen percent times 6.25).

Example 5

One hundred grams of dried cells of *Corynebacterium glutamicum* (*Micrococcus glutamicus*) ATCC 13761 are suspended in 2 liters of 1 N oxalic acid and heated over a boiling water bath with stirring. After the temperature of the contents rises up to 95° C., the contents are maintained for 30 minutes at this temperature and then cooled rapidly. Adjustment of the pH to 4.0 is then carried out with 10 N sodium hydroxide and this is followed by centrifugation to eliminate the supernatant.

One liter of an 8 M urea solution is added to the residue. The pH is adjusted to 7.0 with sodium hydroxide, and the solution is kept at 60° C. for 24 hours with stirring to extract the protein. Subsequently, the solution is centrifuged to collect the supernatant liquid, which is dialyzed in dialyzing membrane bags against running tap water. After 72 hours of dialysis, the dialyzed extract is removed, adjusted to a pH of 4.0 with hydrochloric acid and allowed to stand overnight in a cold room kept at 5° C. The resulting precipitated protein is recovered by centrifugation. It is then lyophilized with the result that 32.8 grams of protein powder is obtained. The resultant protein powder shows a water content of 5.4% and a protein content of 86.9% (total nitrogen percent times 6.25). Artificial digestion ratios observed with trypsin and pepsin are 96.9% and 79.8%, respectively. These are the same or better than that of a commercial reagent casein determined by the same method.

Example 6

One kg. of lyophilized cells of *Corynebacterium glutamicum* (*Micrococcus glutamicus*) ATCC 13761 is suspended in 20 liters of 1 N oxalic acid solution and maintained at 100° C. for 20 minutes with agitation. The pH of the suspension is adjusted to 4.0 with sodium hydroxide after rapid cooling, and the suspension is centrifuged to separate and remove the supernatant liquid. The residue is extracted at room temperature for 3 hours by the addition of 10 liters of 2% sodium hydroxide with stirring. This is centrifuged to remove the solid constituents. Then, 10.2 liters of the supernatant is adjusted to pH 4.0 by the addition of hydrochloric acid and allowed to stand overnight in a cold room maintained at 5° C. Centrifugation is then carried out to obtain an extracted protein. The separated protein is washed once with water having a pH of 4.0. This is followed by centrifugation and the addition of a proper amount of water so as to obtain a porridge-like fluid. Drying is then effected with a spray dryer.

The yield of dry product is 483 grams. The protein product shows a water content of 5.2% and a crude protein content of 80.0% (total nitrogen percent times 6.25). The artificial digestion ratios of this product observed with trypsin and pepsin are 96.5% and 80.2%, respectively.

Example 7

16.7 grams of protein powder is obtained by suspending 300 grams of living cells of *Brevibacterium ammoniagenes* ATCC 6872 [(water content, 64.8%; protein content, 51.3% (to dry weight)] in 2 liters of 1 N acetic acid, heating in a boiling water bath for 30 minutes with stirring, adjusting to a pH of 7.5 with 10 N sodium hydroxide after rapid cooling of the contents, stirring for a further 6 hours, centrifuging to obtain 2.25 liters of supernatant, adjusting the supernatant to a pH of 4.0 by the addition of hydrochloric acid, allowing the resultant solution to stand overnight in a cold room maintained at 5° C., centrifuging the precipitated protein, washing it with water having a pH of 4.0 and then further centrifuging and lyophilizing. The product shows a water content of 2.0% and a crude protein content (total nitrogen percent times 6.25) of 90.1% (to dry weight).

Example 8

Three hundred grams of living cells of *Brevibacterium ammoniagenes* ATCC 6872 are subjected to heat treatment in acetic acid solution similarly as described in Example 7. The pH of the suspension is subsequently adjusted to 4.0 with 10 N caustic soda after rapid cooling, and the precipitate is extracted at 40° C. for 24 hours by addition of 1.5 liters of 8 M urea solution after centrifugation. The supernatant liquid thus obtained is dialyzed in dialyzing membrane bags against running tap water for 72 hours. The dialyzed extract is adjusted to pH 4.0 with hydrochloric acid, allowed to stand overnight at 5° C., centrifuged, washed once with water at pH 4.0, and then centrifuged and lyophilized. As a result, 18.8 grams of dried protein powder is obtained.

Although certain specific microorganisms have been shown as exemplary hereinabove, it is to be understood that the present invention is not to be limited thereto. Thus, for example, microorganisms of *Arthrobacter paraffineus* ATCC 15590 and *Micrococcus sodonensis* ATCC 15932 may just as well be readily employed. Yeasts may also be used. Examples thereof include *Saccharomyces cerevisiae* ATCC 7754, *Saccharomyces fragilis utilis* ATCC 8608, *Tolura utilis* ATCC 15239 and *Candida* ATCC 9950.

The invention being thus described, it will be obvious that the same may be varied in many ways. Such variations are not to be regarded as a departure from the spirit and scope of the invention and all such modifications as would be obvious to one skilled in the art are intended to be included.

We claim:

1. A process for extracting proteins from microorganisms which comprises heating said microorganisms for a time so as not to degrade the protein at a temperature of from about 60° to about 100° C. in an aqueous acidic solution having an acid concentration of from about 0.5 N to about 2 N, neutralizing the resultant mixture to a pH of about 6 to 9, and extracting the proteins therefrom with an aqueous solution of a suitable extracting agent.

2. The process of claim 1, wherein said acidic solution comprises an aqueous solution of a mineral acid.

3. The process of claim 2, wherein said mineral acid is selected from the group consisting of hydrochloric acid, sulfuric acid and phosphoric acid.

4. The process of claim 1, wherein said acidic solution comprises an aqueous solution of an organic carboxylic acid.

5. The process of claim 4, wherein said organic carboxylic acid is selected from the group consisting of acetic acid, oxalic acid, citric acid and formic acid.

6. The process of claim 1, wherein said heating step is carried out for from about 15 to about 30 minutes.

7. The process of claim 1, wherein said extracting agent is selected from the group consisting of water, aqueous solutions of inorganic salts, aqueous alkali solutions and aqueous urea solutions.

8. The process of claim 1, wherein said extracting agent is an aqueous solution of sodium hydroxide.

9. The process of claim 1, wherein said extracting step is carried out at a pH of about 7.

10. The process of claim 1, wherein said extracting agent is an aqueous solution of urea and said extracting step is carried out at a pH of about 6 to 9.

11. The process of claim 1, wherein said microorganisms are gram-positive bacteria.

12. The process of claim 1, wherein said microorganisms are selected from the group consisting of *Brevibacterium ammoniagenes* and *Corynebacterium glutamicum*.

13. A process for extracting proteins from microorganisms which comprises heating said microorganisms for a period of time so as not to degrade the protein at a temperature of from about 60° to about 100° C. in a 0.5–2 N aqueous solution of an acid selected from the group consisting of mineral acids, acetic acid, oxalic acid, citric acid and formic acid, neutralizing the resultant mixture of a pH of about 6 to 9, and extracting the proteins therefrom with an extracting agent selected from the group consiting of water, aqueous solutions of inorganic salts, aqueous alkali solutions and aqueous urea solutions.

14. The process of claim 13, wherein said extracting agent is an aqeous solution of sodium hydroxide.

15. The process of claim 13, wherein said extracting step is carried out at a pH of about 7.

16. The process of claim 13, wherein said extracting agent is an aqueous solution of urea and said extracting step is carried out at a pH of about 6 to 9.

17. The process of claim 13, wherein said microorganisms are gram-positive bacteria.

18. The process of claim 13, wherein said microorganisms are selected from the group consisting of *Brevibacterium ammoniagenes* and *Corynebacterium glutamicum*.

References Cited

UNITED STATES PATENTS

| | | | |
|---|---|---|---|
| 3,347,688 | 10/1967 | Frabenfeld et al. | 99—14X |
| 3,268,412 | 8/1966 | Champagnat et al. | 195—3 |

OTHER REFERENCES

Carpenter, P., Microbiology, pp. 268, 270, W. B. Saunders Co., Philadelphia, Pa., 1967.

A. LOUIS MONACELL, Primary Examiner

R. B. ANDEWELT, Assistant Examiner

U.S. Cl. X.R.

99—14, 97; 195—28

UNITED STATES PATENT OFFICE
CERTIFICATE OF CORRECTION

Patent No. 3,585,179          Dated  June 15, 1971

Inventor(s) Hirotoshi Samejima, Hiroshi Teranishi, and Takashi Deguchi

It is certified that error appears in the above-identified patent and that said Letters Patent are hereby corrected as shown below:

Column 1, line 9, should read:

--41/51089; Aug. 15, 1966, 41/53277; Feb. 21, 1967, 42/10667--

Signed and sealed this 2nd day of November 1971.

(SEAL)
Attest:

EDWARD M. FLETCHER, JR.          ROBERT GOTTSCHALK
Attesting Officer                Acting Commissioner of Patents